United States Patent [19]

Eaton, Jr. et al.

[11] 3,773,563
[45] Nov. 20, 1973

[54] LIFE INDICATOR FOR PRIMARY CARBON ZINC BATTERIES

[75] Inventors: Edgar P. Eaton, Jr., Morristown; Bernard P. Rouvet, Montville, both of N.J.

[73] Assignee: The Carbone Corporation, Boonton, N.J.

[22] Filed: Feb. 22, 1972

[21] Appl. No.: 227,755

[52] U.S. Cl. ............................................. 136/182
[51] Int. Cl. ........................................ H01m 45/06
[58] Field of Search ................................... 136/182

[56] References Cited
UNITED STATES PATENTS

| | | | |
|---|---|---|---|
| 664,008 | 12/1900 | Schoenmehl | 136/182 |
| 1,505,656 | 8/1924 | Martus | 136/182 |
| 2,189,463 | 2/1940 | Eddy | 136/182 |
| 2,980,754 | 4/1961 | Reilly et al | 136/182 |
| 3,563,806 | 12/1967 | Hruden | 136/182 |

*Primary Examiner*—Donald L. Walton
*Attorney*—Albert F. Kronman

[57] ABSTRACT

A battery indicator which remains dormant in the body of a zinc electrode until the zinc is eaten away by electrochemical action and a portion of the indicator material is exposed to the electrolyte. Dye within the indicator is then liberated and colors the electrolyte solution, providing a signal that the battery should be replaced within a specified time interval. To provide fast mixing action of the dye in the electrolyte, a chemical reactor such as aluminum powder or an alkali hydroxide is also placed in the indicator. In one alternate arrangement, a spring is compressed in the indicator cavity so that it will provide fast exit velocity for the dye and chemical mixing agent.

7 Claims, 5 Drawing Figures

LIFE INDICATOR FOR PRIMARY CARBON ZINC BATTERIES

BACKGROUND OF THE INVENTION

Primary batteries are used in many installations where there is no other source of electric power available. In railway signaling, aids to navigation, and many other applications, primary cells are used and, after their energy is exhausted, they must be replaced by other similar batteries. Most of the primary batteries use zinc as one of the electrodes because it provides a voltage difference between copper, carbon, and other base metals. The first types of zinc batteries were enclosed in glass jars and other transparent containers so that an operator could observe the extent of the energy available by noting the size and condition of the zinc electrode. When the electrode was almost gone or when its active surface was reduced to a small area, replacement was required.

Present primary batteries are housed in opaque containers such as hard rubber or a phenol plastic composition and an inspector cannot see either of the electrodes. Viewing from above, through a vent in the cover is not sufficient since the electolyte often becomes cloudy near the zinc electrode surface, and the physical construction of the battery does not permit a good view of the electrodes by just looking from the top. While it is possible to provide a clear plastic top or even a clear plastic container for the battery itself, the formation of salts very often obscures a good view of the zinc electrodes in a discharged or partially discharged state. In the past, replacement of primary batteries was determined as follows: (1) The cells were changed at the end of a routine period which was based on the estimated daily discharge rate and the total capacity of the cell units; (2) Terminal voltage measurements were made at specified periods and replacement was made when the voltage fell below a predetermined value, measured at a specified load and temperature; (3) An ampere-hour meter was connected to the battery and replacement was made at a predetermined ampere-hour value. All these determinations have their disadvantages, especially when the batteries are subject to extremes of load and temperature.

One reliable way of determining the replacement time of a primary zinc battery is to observe the condition of the zinc electrode. As long as there is an adequate area of zinc in the electrolyte, the battery can furnish electrical energy. When the area falls below a limiting value or is about to reach this condition, replacement should be made.

It is an object of the invention to provide a simple and reliable method for determining when the zinc electrodes have been eroded by electrochemical action to the point where the battery would fail if left in service for an additional four to six weeks.

One of the features of the invention is the inclusion of a small quantity of dye in recess or cavity drilled in a portion of the zinc electrode. The recess is then sealed. When the electrode is consumed the dye is released, indicating that a replacement is needed. The dye coloring is intense enough to be observed by an inspector with a flash light when a cap on top of the battery container is removed, or through a clear plastic cover.

Another feature of the invention includes means for mixing the dye with the electrolyte as soon as it is released. Another chemical which reacts actively with the electrolyte can be used. A spring may also be included in the recess in the zinc electrode for propelling the dye into the electrolyte and thereby insuring mixing action.

Other features and additional details of the invention will be disclosed in the following description, taken in connection with the accompanying drawings.

DESCRIPTION OF THE PREFERRED EMBODIMENT

Figure 1:
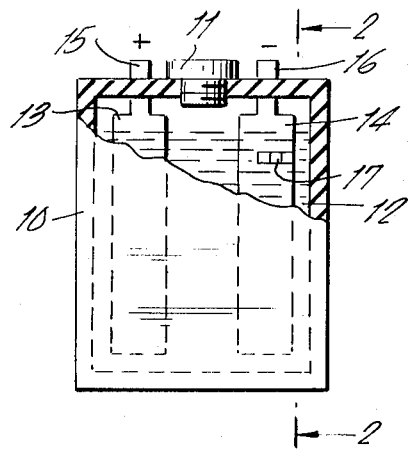
FIG. 1 is an end view of a primary battery with parts broken away to show the internal structure according to the present invention.
Figure 2:
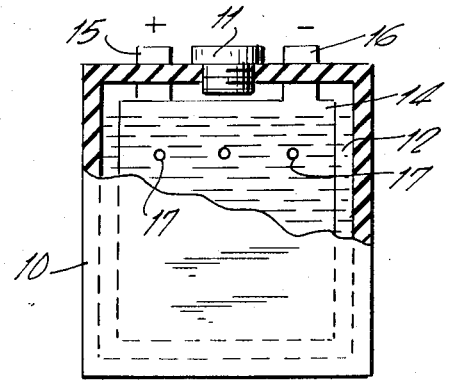
FIG. 2 is a side view of the battery shown in FIG. 1 with cross sectional areas taken generally along line 2—2 of that figure.

Referring now to FIGS. 1 and 2, a primary battery is shown encased in an opaque insulator case 10 provided with a cap 11. An electrolyte 12 is provided in the case 10 and at least two electrodes 13 and 14 are immersed in the electrolyte 12 having connecting terminals 15 and 16 secured in the top of the case for support and for connection to an external circuit. One of the electrodes 14 is made of zinc and is generally the negative pole. At least one indicator 17 is incorporated in the zinc electrode, three indicators 17 being shown in FIG. 2.

Figure 3:
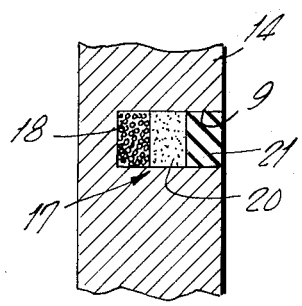
FIG. 3 is a cross sectional view, at an enlarged scale, of a portion of a zinc electrode showing the details of one form of the invention when the battery is first put into service.
Figure 4:
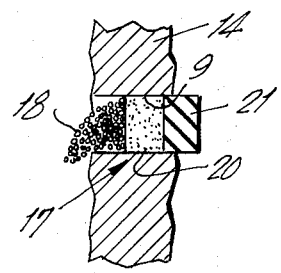
FIG. 4 is a cross sectional view of the portion of the electrode shown in FIG. 3, but showing the condition of the electrode and the indicator when replacement of the battery should be scheduled.

Referring now to FIGS. 3 and 4, the indicator 17 is shown in greater detail. A cylindrical recess 9 is drilled into the zinc plate 14 and a quantity of dye 18 is inserted and positioned at the bottom of the recess. Then a small amount of aluminum powder 20 is put on top of the dye 18 (or the aluminum powder and dye can be mixed together) and finally the recess 9 is sealed by a plug 21 of pitch or some similar substance which is waterproof, inert, and will retain the contents of the capsule 17 in a dry state.

The battery is now put into service and as current is furnished to a load, the zinc is slowly changed to some other soluble form such as zinc salts or zinc hydroxide. Over a period of use, the zinc plate 14 is reduced in thickness until the zinc end of the recess is eaten away and the dye 18 liberated. This condition is shown in FIG. 4. The dye may be a powder or a liquid but, in any case, the simple release of the dye may not provide enough mixing action to color all the electrolyte in a short enough time. For this reason, aluminum powder 20 may be added to the indicator between the dye and the plug 21. Aluminum powder reacts energetically with any electrolyte whether it be acid or alkali, and produces enough turbulence to mix the dye with the electrolyte and distribute the colored solution to all parts of the battery case. Thereafter, when the battery is inspected, an operator removes the cap 11 and views the electrolyte with the aid of a portable lamp. The dye indicates that replacement should be made soon.

Figure 5:
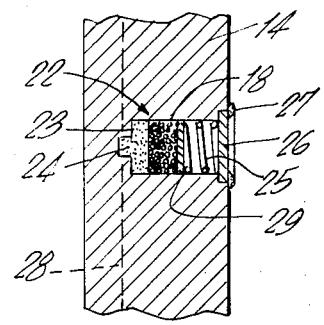
FIG. 5 is a cross sectional view, similar to FIG. 3, but showing an alternate form of the invention, using a coiled spring to aid in ejecting and mixing the dye.

The indicator 22 shown in FIG. 5 is an alternate form and comprises a recess 9 drilled in the zinc plate as before, but this time the bottom of the recess is formed with a small shoulder 23. An alkaline powder 24 such as sodium or potassium hydroxide is placed in the bottom of the recess and the dye 18 next. Then a flat disk 29 of zinc is placed on the dye particles and a coiled spring 25 is pressed into contact with the disk 29. A zinc cap 26 is now pressed on the spring and the edges of the cap are soldered into place by a solder seal 27 which extends for the entire periphery of the cap.

When the zinc electrode is consumed by electrolytic action the metal is reduced to the dimension indicated by dotted line 28 and the end of the indicator 22 is exposed. The electrolyte comes in contact with the alkali material and considerable turbulence results, mixing the dye 18 and permitting the spring 25 to eject both the alkali and the dye through the small hole in the plate 14. The disk 29 limits against the shoulder 23 and is held in that position by the force of the spring 25. The turbulence continues after the materials have been ejected from the recess and the dye 18 is mixed with the electrolyte to provide an indicator calling for replacement.

A dye which has been found to give satisfactory results in a battery electrolyte is tropaelin-O which produces a bright red-orange color in a potassium hydroxide solution. Fluorescein, $C_{20} H_{12} O_5$, is also effective as a coloring agent, producing a greenish-yellow color.

It will be noted that the color signal is released before the zinc electrode is entirely consumed. The drawings indicate that considerable metal remains. This fact is taken into consideration and when an inspection shows the color signal, it means that replacement can be made in a few weeks after the color signal is discovered.

The color signal means is inexpensive, reliable, and provides a certain measure of fail-safe time.

Having thus fully described the invention, what is claimed as new and desired to be secured by Letters Patent of the United States, is:

1. A battery indicator for determining the limiting thickness of a zinc electrode plate in an electrolyte comprising; a recess formed in the zinc electrode, the bottom of said recess being positioned a predetermined distance from one face of the plate where electrolytic erosion occurs; an indicating dye positioned in the bottom of the recess for release into the electrolyte when erosion eats away the portion of the zinc electrode containing the indicator; a quantity of reactive material positioned in said recess for reacting with the electrolyte and creating turbulence therein for mixing the dye with the electrolyte; and a plug positioned in the recess to normally isolate the dye and the reactive material from the battery electrolyte during the normal life of the battery.

2. An indicator as claimed in claim 1 wherein said recess is a cylindrical bore shorter than the electrode thickness whose axis is perpendicular to the face of the electrode plate.

3. An indicator as claimed in claim 1 wherein said dye is fluorescene.

4. An indicator as claimed in claim 1 wherein said reactive material is aluminum powder.

5. An indicator as claimed in claim 1 wherein said reactive material is an alkali hydroxide.

6. An indicator as claimed in claim 1 wherein said plug is made of pitch.

7. An indicator as claimed in claim 1 wherein a flat disk overlies the dye and reactive material a coiled helical spring is positioned in said recess, and is held in compression between the disk and the plug for aiding in forcing the dye into the electrolyte.

* * * * *